United States Patent
Coldwate

(10) Patent No.: US 10,428,682 B2
(45) Date of Patent: Oct. 1, 2019

(54) ELECTRIC MOTOR ARRANGEMENTS FOR GAS TURBINE ENGINES

(71) Applicant: Hamilton Sundstrand Corporation, Charlotte, NC (US)

(72) Inventor: Joseph K. Coldwate, Roscoe, IL (US)

(73) Assignee: Hamilton Sundstrand Corporation, Charlotte, NC (US)

(*) Notice: Subject to any disclaimer, the term of this patent is extended or adjusted under 35 U.S.C. 154(b) by 104 days.

(21) Appl. No.: 15/405,491

(22) Filed: Jan. 13, 2017

(65) Prior Publication Data

US 2018/0202315 A1 Jul. 19, 2018

(51) Int. Cl.
| | |
|---|---|
| *F01D 21/12* | (2006.01) |
| *F01D 5/02* | (2006.01) |
| *F01D 15/10* | (2006.01) |
| *F01D 21/00* | (2006.01) |
| *H02P 27/06* | (2006.01) |
| *H02P 6/17* | (2016.01) |

(Continued)

(52) U.S. Cl.
CPC .............. *F01D 21/12* (2013.01); *F01D 5/02* (2013.01); *F01D 15/10* (2013.01); *F01D 21/003* (2013.01); *F01D 25/36* (2013.01); *H02K 7/14* (2013.01); *H02K 7/1823* (2013.01); *H02K 11/25* (2016.01); *H02P 6/17* (2016.02); *H02P 27/06* (2013.01); *H02P 29/66* (2016.02); *F05D 2220/32* (2013.01); *F05D 2220/764* (2013.01); *Y02T 50/671* (2013.01)

(58) Field of Classification Search
CPC . F01D 15/10; F01D 5/02; F01D 21/00; F01D 25/12; F01D 25/36; F01D 21/12; H02K 7/1823; H02K 7/14; H02K 7/116; H02K 7/118; H02P 2101/30; H02P 27/06; H02P 6/20; H02P 6/10; H02P 2101/25; H02P 29/50

See application file for complete search history.

(56) References Cited

U.S. PATENT DOCUMENTS

| 2,129,529 A * | 9/1938 | Howard ................. F01D 25/34 |
| | | 200/61.46 |
| 4,473,752 A | 9/1984 | Cronin |

(Continued)

FOREIGN PATENT DOCUMENTS

| EP | 2757230 A1 | 7/2014 |
| EP | 2952694 A1 | 12/2015 |

(Continued)

OTHER PUBLICATIONS

Extended European Search Report dated Aug. 21, 2018, issued during the prosecution of European Patent Application No. EP 18151722.8 (8 pages).

*Primary Examiner* — Thai T Dinh
(74) *Attorney, Agent, or Firm* — Locke Lord LLP; Scott D. Wofsy; Judy R. Naamat

(57) ABSTRACT

A motor arrangement includes a shaft, a motor with a cage winding fixed in rotation relative to the shaft, and a generator. The generator includes a permanent magnet assembly fixed in rotation relative to the shaft. The permanent magnet assembly and the cage winding are fixed in rotation relative to one another such that the generator generates a sinusoidal AC voltage signal according to an excitation phase applied to the motor for controlling rotor distortion during cool down of a gas turbine engine.

18 Claims, 5 Drawing Sheets

(51) Int. Cl.
  *H02K 7/18*   (2006.01)
  *H02K 7/14*   (2006.01)
  *H02K 11/25*  (2016.01)
  *F01D 25/36*  (2006.01)
  *H02P 29/66*  (2016.01)

(56) References Cited

U.S. PATENT DOCUMENTS

| | | | | |
|---|---|---|---|---|
| 4,862,009 A * | 8/1989 | King | ............ | F02N 11/04 290/22 |
| 4,967,887 A * | 11/1990 | Annacchino | ............ | F16D 37/02 192/103 R |
| 5,587,647 A | 12/1996 | Bansal et al. | | |
| 5,675,203 A * | 10/1997 | Schulze | ............ | B60K 6/26 310/103 |
| 6,487,096 B1 * | 11/2002 | Gilbreth | ............ | H02J 1/10 363/35 |
| 6,844,707 B1 * | 1/2005 | Raad | ............ | F02N 11/04 290/46 |
| 6,998,728 B2 * | 2/2006 | Gupta | ............ | F01D 15/10 290/1 A |
| 7,038,336 B2 * | 5/2006 | Takano | ............ | H02K 5/00 310/254.1 |
| 7,597,164 B2 * | 10/2009 | Severinsky | ............ | B60H 1/004 180/65.27 |
| 7,728,447 B2 * | 6/2010 | Becquerelle | ............ | H02K 7/116 290/3 |
| 8,820,046 B2 * | 9/2014 | Ross | ............ | F02C 7/26 60/39.13 |
| 2002/0047455 A1 * | 4/2002 | Dhyanchand | ............ | F02N 11/04 310/211 |
| 2004/0150232 A1 | 8/2004 | Xu et al. | | |
| 2011/0109256 A1 * | 5/2011 | Campbell | ............ | B60L 3/12 318/400.37 |
| 2015/0171674 A1 * | 6/2015 | Lee | ............ | H02K 1/246 318/724 |
| 2015/0171722 A1 * | 6/2015 | Hon | ............ | H02K 21/025 310/12.24 |
| 2015/0333602 A1 * | 11/2015 | Mohr | ............ | H02K 11/0073 310/54 |
| 2016/0177770 A1 | 6/2016 | Adams et al. | | |
| 2016/0329842 A1 | 11/2016 | Bangura et al. | | |

FOREIGN PATENT DOCUMENTS

JP    07143731 A  *  6/1995
WO    2014/196975 A1   12/2014

* cited by examiner

ELECTRIC MOTOR ARRANGEMENTS FOR GAS TURBINE ENGINES

BACKGROUND OF THE INVENTION

1. Field of the Invention

The present disclosure relates to electric motors, and more particularly to electric motors for rotating gas turbine engine rotors for controlling rotor distortion.

2. Description of Related Art

Gas turbine engines, such as in aircraft, can cool unevenly following shutdown of the engine. Typically, because of convection, the upper portion of the engine remains hotter than the bottom portion of the engine for a period of time after shutdown. This can cause uneven cooling of the engine rotor, the rotor top portion remaining hotter than the rotor bottom portion. In some gas turbine engines the uneven cooling can result in a temperature differential between the rotor top and bottom portions sufficient to distort the rotor such that the rotor bows upwardly, the rotor becoming eccentric relative to its axis, taking on an effectively arcuate shape instead of being generally cylindrical. The rotor distortion can be increase engine vibration upon startup. In some circumstances, the distortion can cause rotor blades to rub against the case interior.

Rotor distortion can be controlled by limiting uneven heating by rotating the engine rotor. Since rotating the engine rotor subsequent to shutdown can reduce the temperature difference between the top and bottom portions of the rotor, limiting distortion, and allow for tighter nominal compressor and turbine blade clearances, motors are sometimes employed to rotate the engine rotor during cool down. Such motors require power and can add weight to the engine.

Such conventional methods and systems have generally been considered satisfactory for their intended purpose. However, there is still a need in the art for improved methods of limiting rotor distortion in gas turbine engines after engine shutdown. The present disclosure provides a solution for this need.

SUMMARY OF THE INVENTION

An electric motor arrangement includes a shaft, a motor with a cage winding connected to the shaft, and a generator. The generator includes a permanent magnet (PM) assembly connected to the shaft. The PM assembly and the cage winding are fixed in rotation relative to one another such that the generator generates position/speed signal when input excitation is applied to the electric motor for rotating a gas turbine engine rotor. The position/speed signal received from the generator can provide position/speed for rotating the rotor using the electric motor to mitigate rotor distortion during engine cool down.

In certain embodiments, a bearing can support the shaft for rotation about a shaft rotation axis. The bearing can be arranged on a side of the motor opposite the generator. The bearing can be arranged on a side of the generator opposite the motor. A temperature sensor can be arranged axially between the motor and the generator. The generator can include a speed/position winding arranged circumferentially about the PM assembly.

In accordance with certain embodiments, a radial air-gap between the generator stator and the PM assembly can purposely be large to minimize cogging torques. The motor can be arranged to provide slow rotation to the rotor. The motor can be a low input voltage AC motor. Excitation phase windings can be arranged circumferentially about the cage winding. It is contemplated that A-phase, B-phase, and C-phase input windings can be arranged circumferentially about the cage winding.

It is also contemplated that an enclosure can house the motor and the generator. The shaft can be supported for rotation within the enclosure. The shaft can have coupling arranged outside the enclosure for transferring rotation to an accessory gearbox or fan gearbox. The temperature sensor can adhesively bonded to an interior enclosure wall between the motor and the generator. A connector can extend between the enclosure interior and exterior. Position/speed signal leads can couple the generator to the connector. Input excitation leads can couple the motor to the connector. Sensor leads can couple the sensor to the connector.

A gas turbine engine includes a stator and a rotor supported for rotation relative to stator about a rotation axis. A motor arrangement as described above is operably connected to the rotor for rotating the rotor about the rotation axis using the electric motor. A motor drive/inverter is connected to the motor arrangement to apply input to the motor based on rotational position/speed signal received from the generator indicative of rotational position of the rotor. In certain embodiments, a battery can be connected to an inverter and a controller to applying the input excitation to the motor based on position/speed signal received from the generator. A temperature sensor can be arranged within the motor enclosure for monitoring temperature within the motor.

A method of controlling rotor distortion in a gas turbine engine includes generating a position/speed signal using a PM generator and rotating the rotor using input excitation applied to an electric motor based on the position/speed signal. The rotation of the rotor changes the position/speed signal according to a common rotation of a generator PM assembly induction motor cage winding. In certain embodiments, rotating the rotor can include inverting DC power into AC power and applying the AC power to the electric motor as the input excitation. In accordance with certain embodiments, temperature of the motor can be determined using a temperature sensor during rotation.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
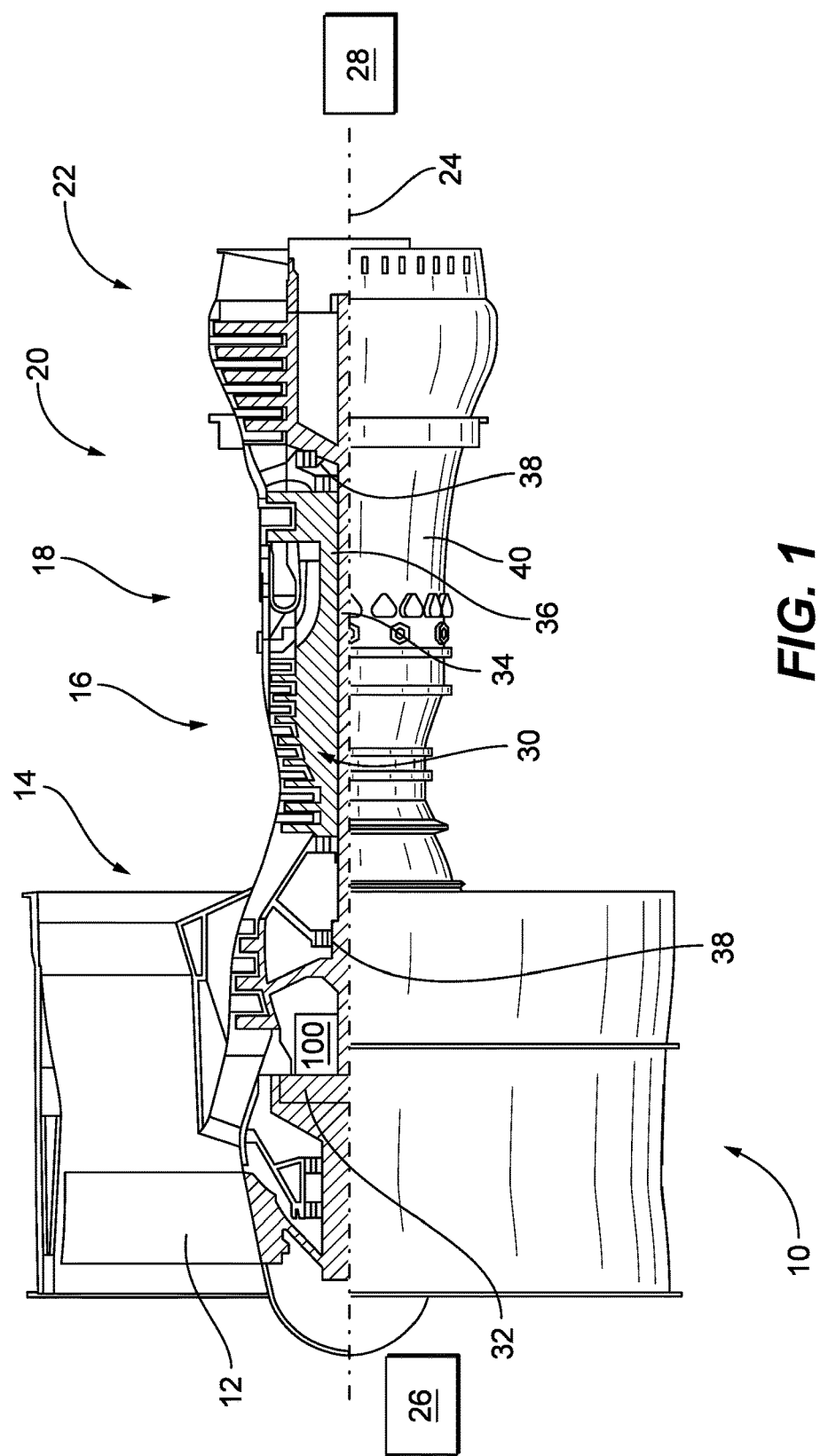
FIG. 1 is a schematic view of an exemplary embodiment of a gas turbine engine with a motor arrangement, showing the motor arrangement operatively connected to a rotor of the gas turbine engine for providing slow rotation to the gas turbine engine rotor.

Reference will now be made to the drawings wherein like reference numerals identify similar structural features or aspects of the subject disclosure. For purposes of explanation and illustration, and not limitation, a partial view of an exemplary embodiment of a motor arrangement in accordance with the disclosure is shown in FIG. 1 and is designated generally by reference character 100. Other embodiments of motors arrangements, gas turbine engines including such motor arrangements, and methods controlling rotor distortion in gas turbine engines by slow rotation provided by such motor arrangements in accordance with the disclosure, or aspects thereof, are provided in FIGS. 2-5, as will be described. The systems and methods described herein can be used for distortion control of a gas turbine engine rotor during cool down in an aircraft, though the present disclosure is not limited to cool down or to aircraft in general.

Referring to FIG. 1, an exemplary gas turbine engine 10, e.g., a high-bypass turbofan engine, is shown. Gas turbine engine 10 includes fan 12, a low pressure compressor 14, a high pressure compressor 16, a combustor section 18, a high pressure turbine 20, and a low pressure turbine 22 arranged along a rotation axis 24. Fan 12 is arranged on a forward end 26 of gas turbine engine 10 and is upstream of low pressure compressor 14. High pressure compressor 16 is arranged downstream of low pressure compressor 14 and upstream of combustor section 18. High pressure turbine 20 is arranged downstream of combustor section 18 and is upstream of low pressure turbine 22, which is arranged on an aft end 28 gas turbine engine 10. Two or more of fan 12, low pressure compressor 14, high pressure compressor 16, high pressure turbine 20, and low pressure turbine 22 form a core 30 of gas turbine engine 10 and rotate in concert with one another. In certain embodiments a gear arrangement 32 may be arranged between fan 12 and core 30. In accordance with certain embodiments, core 30 may include a low pressure rotor 34 coupling low pressure compressor 14 for rotation with low pressure turbine 22 for rotation with one another, and a high pressure rotor 36 coupling high pressure compressor 16 with high pressure turbine 20 for rotation with one another. Bearing arrangements 38 support core 30 for rotation within a case 40, which is fixed in rotation relative to core 30.

During various operating regimes core 30 rotates within case 40 such that tips of blades fixed relative to the core rotate in proximity to the interior of case 40, which is fixed relative to core 30. In this respect low pressure compressor 14 ingests air from the ambient environment, compresses the ingested air, and communicates the compressed air to high pressure compressor 16. High pressure compressor 16 further compresses the received compressed air and communicates the further compressed air to combustor section 18. Combustor section 18 generates high pressure combustion products, which is communicated to high pressure turbine 20. High pressure turbine 20 expands the combustion products, extracts work from the expanding combustion provides for powering high pressure compressor 16, and communicates the combustion products to low pressure turbine 22. Low pressure turbine 22 further expands the combustion products, extracts additional work from the expanded combustion products for powering low pressure compressor 14, and communicates the further expanded combustion products to the ambient environment.

As will appreciated by those of skill in the art in view of the present disclosure, gas turbine engine 10 is operable at a range of operating conditions between design operating conditions and off-design operating conditions. In the context of engine shutdown, a temperature differential may develop within core 30 owing to convection, which can distort core 30 by thermal induced geometry change. Such distortion can cause increased vibration and/or rubbing of blades (or vanes) between core 30 and case 40, which can negatively affect performance of gas turbine engine 10. Motor arrangement 100 is operatively connected to gas turbine engine 10 to provide rotational energy through gear arrangement 32, which can be an accessory gear box, fan gear, or any other gear arrangement, as suitable for a given application, to control distortion of core 30, e.g., low pressure rotor 34 and/or high pressure rotor 36, by providing slow rotation during cool down of gas turbine engine 10.

Figure 2:
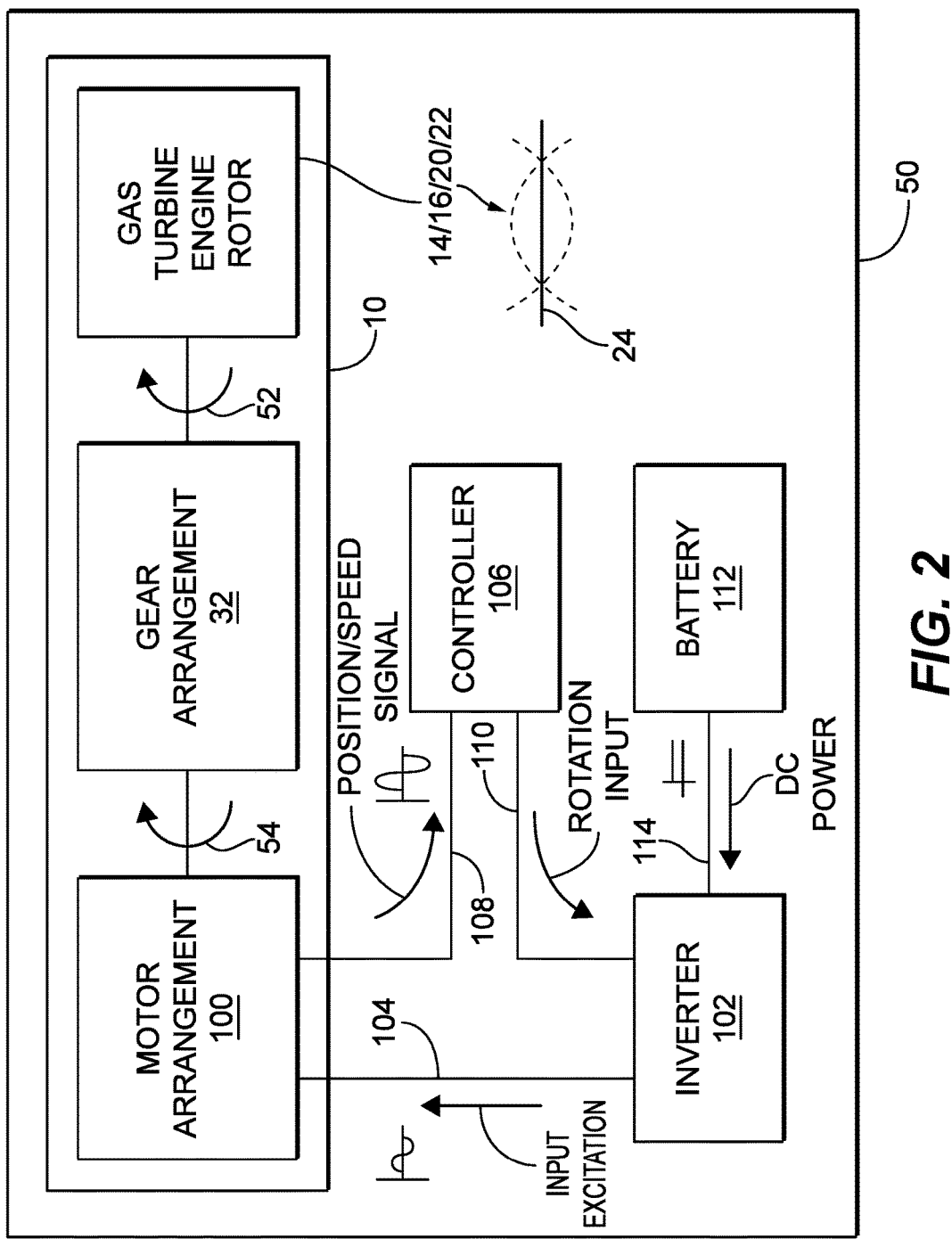
FIG. 2 is block diagram of an aircraft with the gas turbine engine of FIG. 1, schematically showing an input excitation provided to the motor arrangement and a position/speed signal received from the motor arrangement.

With reference to FIG. 2, an aircraft 50 is shown. Aircraft 50 includes gas turbine engine 10 with motor arrangement 100, an inverter 102, motor leads 104, a controller 106, generator leads 108, and controller leads 110. Motor arrangement 100 is housed within gas turbine engine 10 and is operatively connected to the gas turbine engine rotor, e.g., low pressure rotor 34 (shown in FIG. 1) and/or high pressure rotor 36 (shown in FIG. 1), to provide low speed rotation 52 to the gas turbine engine rotor. Low speed rotation 52 may be applied to the gas turbine engine rotor via gear arrangement 32, which can be a separate fan drive gearbox, which receives high speed rotation 54 from motor arrangement 100. In certain embodiments, motor arrangement 100 provides between about 7 and 10 watts of shaft power at a high speed rotation of about 4200 rpm to rotate the gas turbine engine rotor at a low rotation speed of about 1 rpm, which is sufficient to limit rotor distortion in certain types of gas turbine engines otherwise susceptible to rotor distortion 14/16/20/22 relative to rotation axis 24.

Motor arrangement 100 is connected to inverter 102 by motor leads 104. Motor leads 104 provide power to motor arrangement 100 in the form of an excitation phase signal, e.g., an input excitation, which is alternating current (AC) power. The excitation phase provides electromotive force to create high speed rotation 54. In certain embodiments, the excitation phase is three-phase AC power. It is contemplated that the excitation phase provide relatively low voltage to motor arrangement 100, e.g., excitation of approximately six (6) volts rms (L-N) three-phase AC power. Operating motor arrangement with relative low excitation voltage allows the motor to be relatively small, allowing motor arrangement 100 and inverter 102 to operate using power supplied by aircraft battery power only. For example, power for rotating the gas turbine engine rotor can be provided solely via battery 112 through battery leads 114, e.g., using 28 volt direct current (DC) aircraft battery power. This removes the need to run the aircraft auxiliary power unit to provide power during main engine cool down.

Motor arrangement 100 is also connected to controller 106 by generator leads 108. Generator leads 108 provide a position/speed signal, e.g., a sinusoidal AC voltage, generated by permanent magnet generator 122 (shown in FIG. 3) of motor arrangement 100. The position/speed signal contains information relating to the rotational speed and/or angular position of the electric motor, and indirectly therethrough, speed and/or angular position information of the gas turbine engine rotor.

Controller 106 includes circuitry, software, or a combination of circuitry and software for determining rotational position and/or speed of the gas turbine engine rotor and generating a rotational input power signal, which controller 106 provides to inverter 102 via controller leads 110. It is contemplated that the position/speed signal provided to controller 106 be a relatively high relative to the excitation phase provided by inverter 102 to motor arrangement 100. This is because the magnitude of the position/speed signal is proportional to the rotational speed of the electric motor, and reliable motor speed information is required from the generator output at relatively low engine speeds, e.g., at start up, etc. For example, in certain embodiments, the position/speed signal has a one (1) volt peak at 100 rpm, a five (5) volt peak at 500 rpm, and about a 42 volt peak at 4200 rpm.

Figure 3:
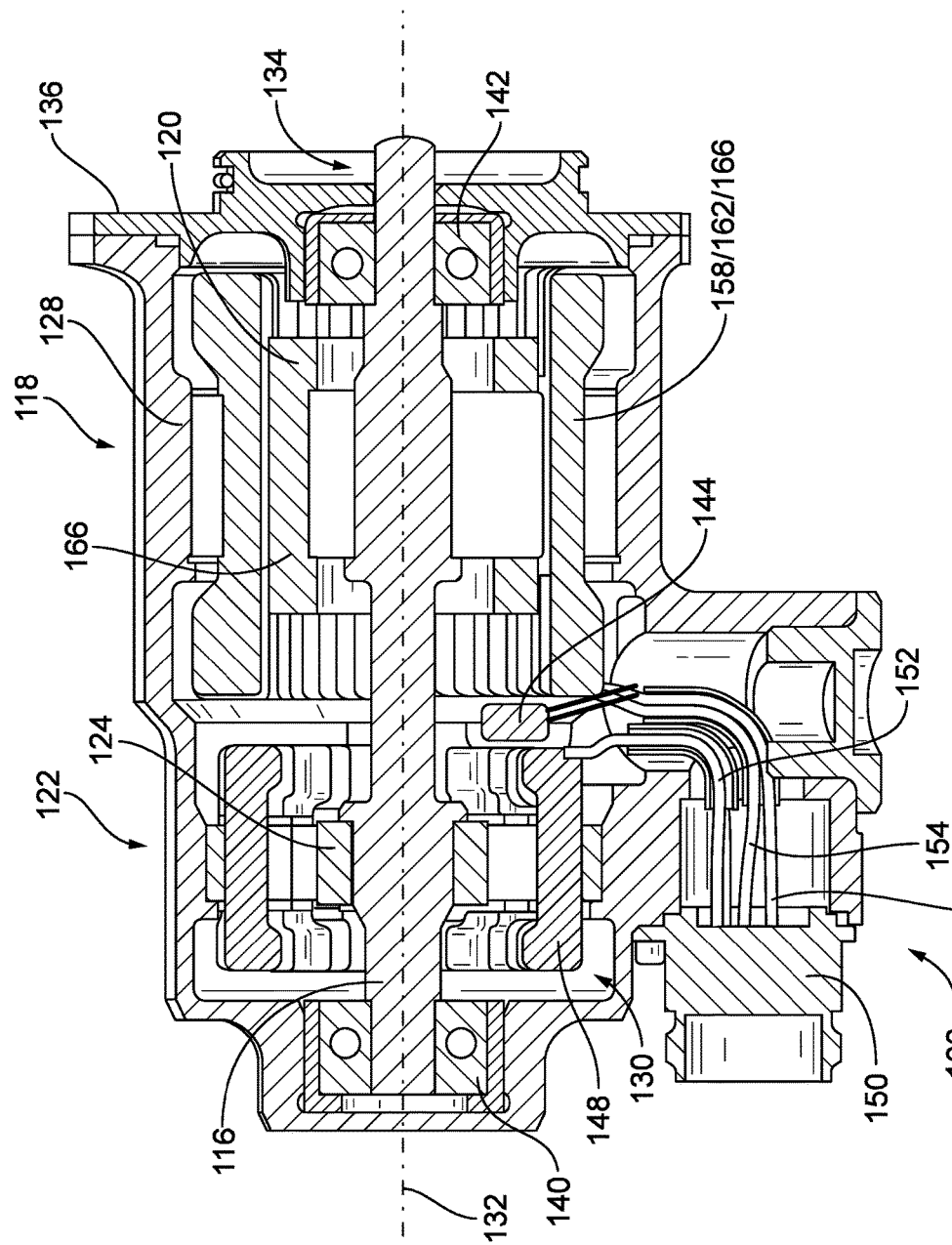
FIG. 3 is cross-sectional side view of the electric motor arrangement of FIG. 1, showing an induction motor integrally connected to a permanent magnet generator.

With reference to FIG. 3, motor arrangement 100 is shown in a side cross-section. Motor arrangement 100 includes a shaft 116, a motor 118 with a cage winding 120, and a generator 122 with a permanent magnet 124. Cage winding 120 and permanent magnet 124 are each connected to the shaft 116. In this respect cage winding 120 and permanent magnet 124 are fixed in rotation relative to one another such that generator 122 generates the position/speed signal (shown in FIG. 2) according to input excitation (shown in FIG. 2) provided to motor 118 motor for controlling rotor distortion 14/16/20/22 (shown in FIG. 2) during cool down of a gas turbine engine, e.g., gas turbine engine 10 (shown in FIG. 1).

Motor arrangement 100 also includes an enclosure 128 with a connector 150. Shaft 116 is supported for rotating within an interior 130 of enclosure 128 for rotation about a rotation axis 132. An end of shaft 116 including a coupling 134 extends through a wall of enclosure 128 such that coupling 134 is arranged on the exterior of enclosure 128, coupling 134 thereby being arranged for communicating rotation to gear arrangement 32 (shown in FIG. 1). Shaft 116 can extend contiguously between opposite ends of motor 110 and generator 122 such that rotor portions of each share a common rotational position. A mounting flange 136 extends about shaft 116 on the exterior of enclosure, mounting flange 136 being arranged to fix motor arrangement 100 to gear arrangement 32. It is contemplated that gear arrangement 32 can be a fan gearbox, an accessory gearbox, or any other gear arrangement, as suitable for an intended application.

Shaft 116 is supported for rotation about rotation axis 132 by a first bearing arrangement 140 and a second bearing arrangement 142. First bearing arrangement 140 is seated within enclosure 128 on a side of generator 122 axially opposite motor 118. Second bearing arrangement 142 is seated within enclosure 128 on a side of motor 118 axially opposite generator 122. Supporting shaft 116 on opposite sides of motor 118 and generator 122 allows for placement of a temperature sensor 144 axially between motor 118 and generator 122 in an axial location otherwise necessary to provide spacing between motor 118 and generator 122. In the illustrated exemplary embodiment temperature sensor 144 is adhesively bonded to an interior surface of enclosure 128, thereby being positioned for thermal communication with the electric motor for providing real-time indication of the electric motor operating temperature.

Motor 118 and generator 122 are contained within enclosure 128 as an integral set. As used herein, integral means that the rotor and stator portions of motor 118 and generator 122 are each contained within interior 130 of enclosure 128 such that the rotor portions of motor 118 and generator 122 rotate in concert with one another, share a common rotational position, and rotate at a common rotational speed. Motor 118 is operably connected to generator 122, operable connection between motor 118 and generator 122 effected by common shaft 116, rotary motion imparted to shaft 116 causing rotary motion of permanent magnet 124 in a 1:1 ratio. As a consequence, application of input excitation to phase windings, e.g., A-phase winding 158, B-phase winding 162, C-phase winding 166, each fixed relative to enclosure 128 and radially opposing cage winding 120 results in high speed rotation 54 (shown in FIG. 2) of shaft 116. High speed rotation 54 causes lockstep rotation of permanent magnet 124 and cage winding 120.

Position/speed winding 148 is fixed relative to enclosure 128, circumferentially surrounds permanent magnet 124 and radially opposes permanent magnet 124. Rotation of permanent magnet 124 in turn induces current with a sinusoidal AC waveform in a position/speed winding 148, which generator 122 provides to controller 106 as the position/speed signal (shown in FIG. 2). Since the angular position and rotational speed of the electric motor can be deduced form analyzing the position/speed signal (e.g., considering zero crossings of the waveform), the controller 106 can adjust its command to the inverter 102 to apply the appropriate input excitation to the electric motor for a given circumstance in a feedback loop.

Connector 150 extends between enclosure interior 130 and the external environment to provide electrical communication between internal components of motor arrangement 100 and external devices. In the illustrated exemplary embodiment motor 118 is a three-phase motor with three phase windings, an A-Phase input excitation lead 156 coupling connector 150 to motor 118 via an A-Phase winding 158, a B-Phase input excitation lead 160 coupling connector 150 to motor 118 via a B-Phase winding 162, and a C-Phase input excitation lead 164 coupling connector 150 to motor 118 via a C-Phase winding 166. Each of A-Phase winding 158, B-Phase winding 162, and C-Phase winding 166 extend circumferentially about cage winding 120. Cage winding 120 provides self-starting capability to motor arrangement 100 and may be formed from an aluminum material 166 or any other suitable lightweight material capable of inductive current generation in the presence of a magnetic field.

Position/speed signal leads 152 couple connector 150 to generator 122 through position winding 148. As will be appreciated by those of skill in the art in view of the present disclosure, the position/speed information received from generator 122 provides rotational position and/or speed feedback information from generator 122. The position/speed information enables motor arrangement 100 to provide sufficient starting torque necessary to breakaway and accelerate the engine core inertia from rest up to rated speed. As will also be appreciated by those of skill in the art in view of the present disclosure, the use of permanent magnet generator 122 to provide position/speed information allows limiting the composition of generator arrangement 100 to materials which can tolerate temperatures commonly found within gas turbine engines, e.g., in excess of 200 degrees Celsius, which would otherwise preclude use of position sensors such as hall effect sensors, which typically employ temperature-limited materials, and avoids the need for resolvers, which are relatively expensive due to their wound wire construction and also require a separate excitation circuit to function.

Figure 4:
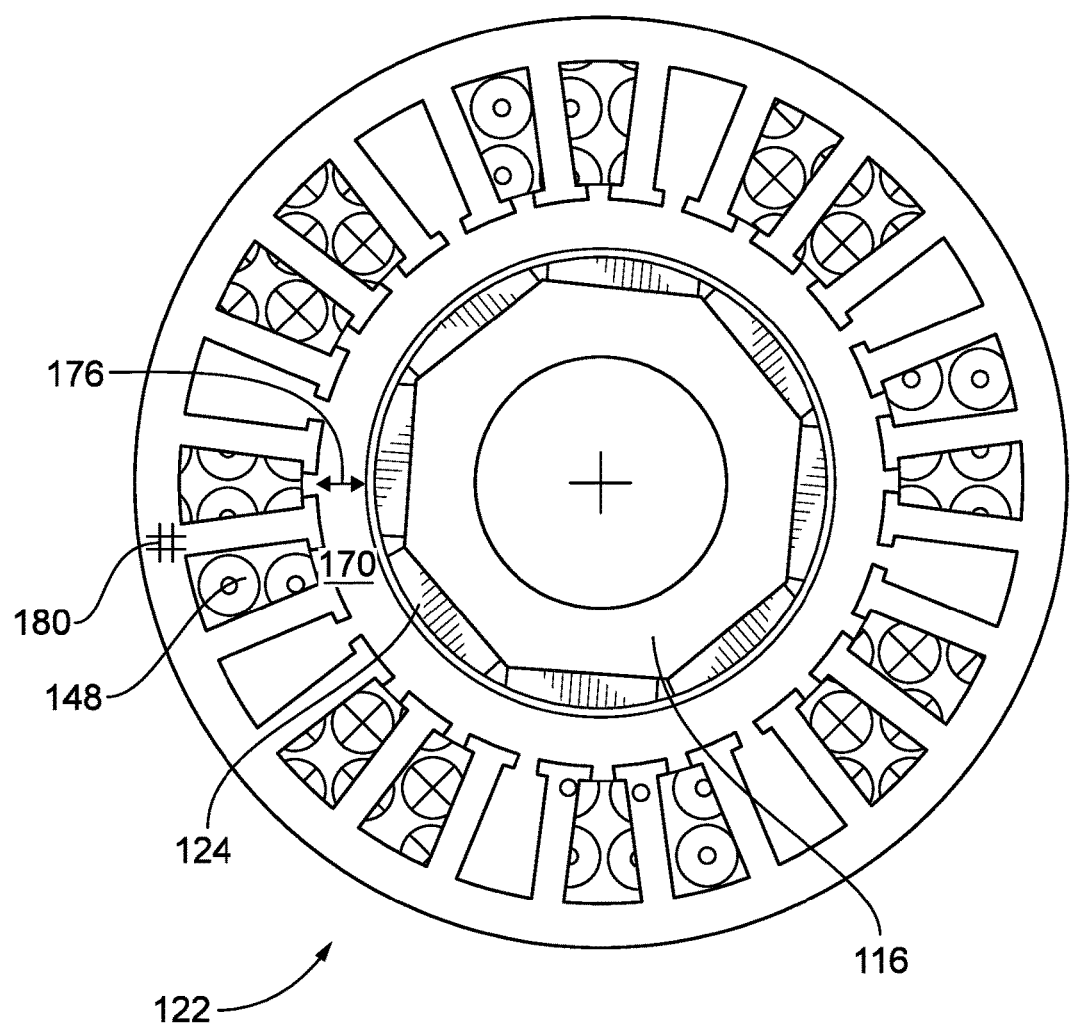
FIG. 4 is cross-sectional end view of the electric motor arrangement of FIG. 1, showing a cogging-limited gap separating a permanent magnet and position winding of the motor arrangement generator.

With reference to FIG. 4, generator 122 is shown in cross-sectional axial view. Because motor 118 (shown in FIG. 3) is arranged to supply a relatively small amount of shaft power, e.g., between about 7 and 10 watts, it can be advantageous to limit heat generation and parasitic torque loss from drag/cogging. Since generator 122 contains permanent magnets 124 which interact with the stator iron 180 and windings to produce AC voltage during rotation, some amount of cogging torque could ordinarily be expected to be is exerted on shaft 116. This cogging torque would oppose the torque generated by cage winding 120 (shown in FIG. 3), and need to be overcome. To limit cogging torque permanent magnet 124 is separated from position winding 148 by a gap 170 with cogging-limited gap width 176, i.e. a gap width which is very large. In certain embodiments, gap 170 has a gap width which is about 0.1 inches wide, which allows motor arrangement 100 to have low internal drag and virtually no cogging to overcome while generator 122 generates the position/speed signal.

Figure 5:
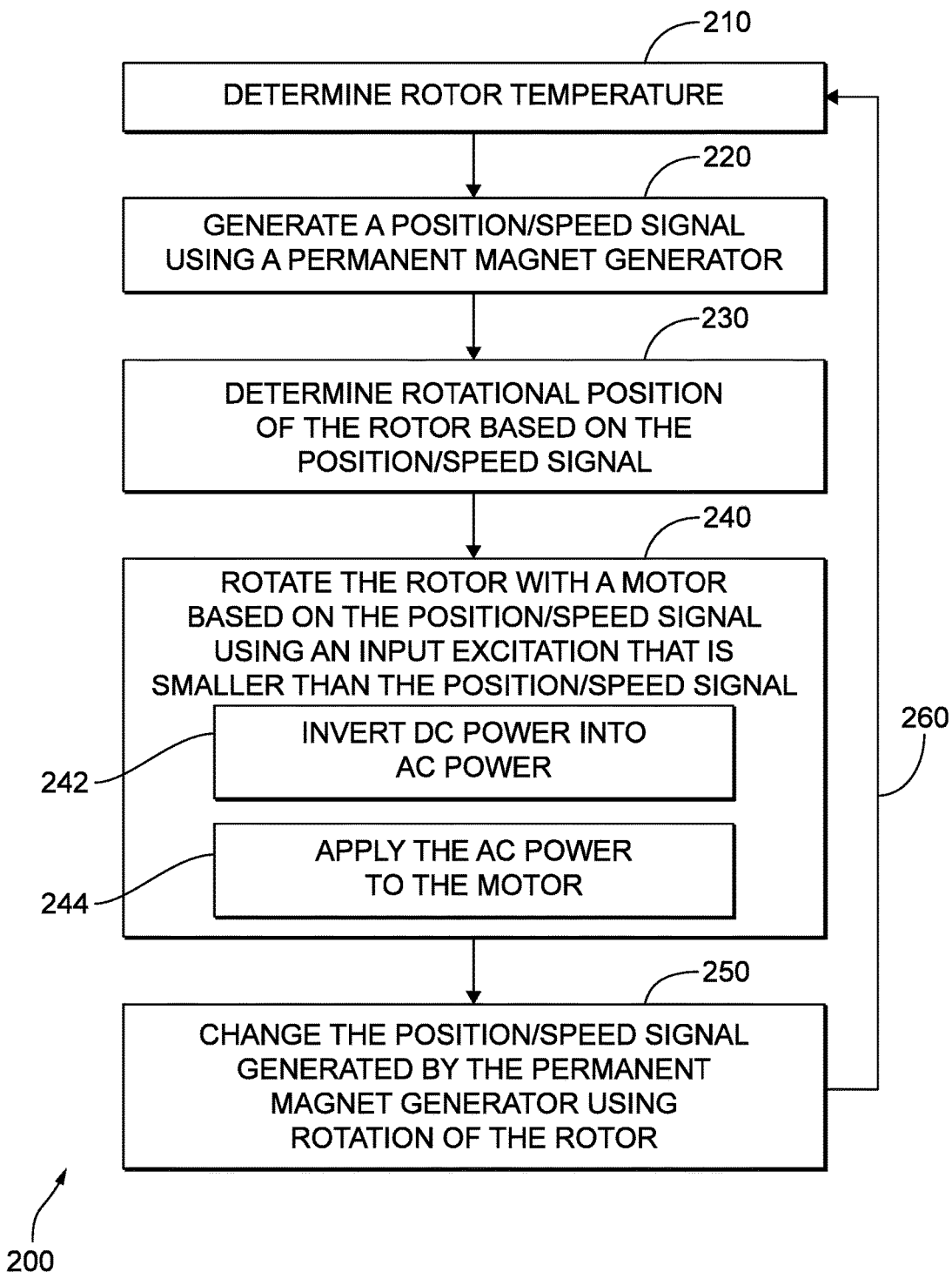
FIG. 5 is block diagram of a method of controlling distortion of a gas turbine engine rotor, showing steps of the method.

With reference to FIG. 5, a method 200 of controlling distortion of a gas turbine engine rotor, e.g., gas turbine engine 10 (shown in FIG. 1), is shown. Method 200 can include determining temperature of a gas turbine engine rotor, e.g., core 30 (shown in FIG. 1), as shown with box 210. Rotational position and/or speed of the rotor are determining using a position/speed signal received from a PM generator, e.g., PM generator 122 (shown in FIG. 3), as shown with box 220. Position/speed of the rotor is determined based on the position/speed signal, as shown with box 230. The rotor is then rotated by applying input excitation to an induction motor, e.g., motor 118 (shown in FIG. 3), based on the position/speed signal provided by the generator, as shown with box 240. Rotating the rotor can include inverting DC power, such as from a battery, into AC power, as shown with box 242. Rotating the rotor can include applying AC power to the motor as the input excitation, as shown with box 244. A subsequent rotational position/speed of the rotor can be determined using the speed/rotation signal provided by the generator, as shown with box 250. Rotational position/speed can be determined following intermittent rotation of the rotor during cool down of the rotor to limit rotor distortion, as shown with arrow 260. It contemplated that the amplitude of the excitation signal provided to the motor can be smaller than amplitude of the position/speed signal received from the generator.

The methods and systems of the present disclosure, as described above and shown in the drawings, provide for electric motors with superior properties including the capability to accelerate from rest and rotate a gas turbine engine core through gearing, via 28 volt DC power, and using a relatively small motor. In certain embodiments, the present disclosure provides motor arrangements with speed sensing capability that can operate in high temperature environments, e.g., at 200 degrees Celsius and higher, and which do not require temperature limited hall-effect sensors or resolvers. In accordance with certain embodiments, motor arrangement described herein can provide a position/speed signal with a one (1) volt peak at low speeds, e.g., at around 100 rpm, and proportionally higher AC voltage signals at higher speeds, e.g., 42 volts peak at about 4200 rpm, with relatively little low voltage ripple. While the apparatus and methods of the subject disclosure have been shown and described with reference to preferred embodiments, those skilled in the art will readily appreciate those changes and/or modifications may be made thereto without departing from the scope of the subject disclosure.

What is claimed is:

1. A motor arrangement, comprising:
    a shaft;
    a motor with a cage winding connected to the shaft; and
    a generator with a permanent magnet (PM) and a position/speed winding, the permanent magnet being connected to the shaft, wherein the PM is fixed in rotation relative to the cage winding, the position/speed winding being configured to output a position/speed signal in response to rotation of the PM, the position/speed signal is used to determine a control signal for controlling inversion of a supplied direct current (DC) power for generation of an excitation signal applied to the motor to cause rotation of the shaft and to provide slow rotation to a gas turbine engine rotor for controlling distortion during cool down.

2. The motor as recited in claim 1, further comprising an enclosure housing the motor and the generator.

3. The motor as recited in claim 2, wherein the shaft is supported for rotation within the enclosure and includes a coupling arranged outside the enclosure.

4. The motor as recited in claim 2, further comprising a temperature sensor adhesively bonded to an interior enclosure wall and arranged between the motor and the generator.

5. The motor as recited in claim 2, further comprising a connector extending between the enclosure interior and enclosure exterior.

6. The motor as recited in claim 5, further comprising a position lead coupling the connector to the generator.

7. The motor as recited in claim 5, further comprising a power lead coupling the connector to the motor.

8. The motor as recited in claim 1, further comprising a bearing supporting the shaft on a side of the motor opposite the generator and/or on a side of the generator opposite the motor.

9. The motor as recited in claim 1, further comprising an A-phase winding, a B-phase winding, and a C-phase winding arranged circumferentially about the cage winding.

10. The motor as recited in claim 1, wherein the position/speed winding extends circumferentially about the PM and is separated therefrom by a cogging-limited gap.

11. The motor as recited in claim 1, wherein the cage winding of the induction motor and the position/speed winding of the generator are coaxially arranged along the shaft for common rotation with one another.

12. A gas turbine engine, comprising:
    a stator;
    a rotor supported for rotation relative to stator about a rotation axis;
    the motor arrangement as recited in claim 1; and
    a controller connected to the generator to receive the position/speed signal and determine the control signal.

13. The gas turbine engine as recited in claim 12, further comprising an inverter connected to the controller and the generator for applying power to the motor based on position of the rotor.

14. The gas turbine engine as recited in claim 13, further comprising a DC power battery connected to the inverter for supplying the DC power.

15. The gas turbine engine as recited in claim 12, further comprising a temperature sensor arranged within an enclosure of the motor arrangement and connected to the controller to ensure the electric motor is operating within a predetermined temperature range.

16. A method of controlling rotor distortion in a gas turbine engine, comprising:
- generating a position/speed signal with a permanent magnet (PM) generator in response to rotation driving rotation of a gas turbine engine;
- determining rotational position of the gas turbine engine rotor based on the position/speed signal; and
- determining a control signal as a function of the position/speed signal;
- controlling, as a function of the position/speed signal, inversion of a supplied direct current (DC) power for generation of an excitation signal;
- applied applying the excitation signal to a motor to cause rotation of the gas turbine engine rotor for controlling distortion during cool down, wherein amplitude of the position/speed signal is larger than amplitude of the excitation signal.

17. The method as recited in claim 16, further comprising determining rotor temperature.

18. The method as recited in claim 16, further comprising inverting the supplied DC as controlled by a control signal determined as a function of the position/speed signal.

* * * * *